United States Patent
Boonstoppel et al.

(10) Patent No.: US 9,075,517 B2
(45) Date of Patent: Jul. 7, 2015

(54) WEB INPUT THROUGH DRAG AND DROP

(75) Inventors: Tobias Boonstoppel, New York, NY (US); Michael Bürge, Zurich (CH); Bernhard Seefeld, New York, NY (US)

(73) Assignee: Google Inc., Mountain View, CA (US)

( * ) Notice: Subject to any disclaimer, the term of this patent is extended or adjusted under 35 U.S.C. 154(b) by 193 days.

(21) Appl. No.: 13/401,641

(22) Filed: Feb. 21, 2012

(65) Prior Publication Data

US 2015/0121240 A1    Apr. 30, 2015

(51) Int. Cl.

| | |
|---|---|
| *G06F 3/048* | (2013.01) |
| *G06F 3/0486* | (2013.01) |
| *G06F 3/0484* | (2013.01) |
| *G06F 3/0481* | (2013.01) |
| *G06F 9/54* | (2006.01) |
| *G06F 3/0482* | (2013.01) |
| *G06F 17/30* | (2006.01) |
| *G06F 9/44* | (2006.01) |
| *G06F 3/0488* | (2013.01) |
| *H04L 29/08* | (2006.01) |

(52) U.S. Cl.
CPC .......... *G06F 3/0486* (2013.01); *G06F 3/04842* (2013.01); *G06F 3/04812* (2013.01); *G06F 9/543* (2013.01); *G06F 3/0482* (2013.01); *G06F 17/30861* (2013.01); *G06F 9/4443* (2013.01); *G06F 3/0488* (2013.01); *G06F 9/54* (2013.01); *H04L 67/02* (2013.01); *G06F 17/30876* (2013.01)

(58) Field of Classification Search
CPC .......... G06F 17/3089; G06F 17/30873; G06F 17/30905; G06F 3/0486; G06F 9/543; G06F 17/30861; G06F 17/30876; G06F 2209/545; G06F 3/0482; G06F 3/0488; G06F 9/4443; G06F 9/54; H04L 67/02
USPC .......................................... 715/760
See application file for complete search history.

(56) References Cited

U.S. PATENT DOCUMENTS

| | | | | |
|---|---|---|---|---|
| 2002/0112093 | A1* | 8/2002 | Slotznick | 709/329 |
| 2005/0198571 | A1* | 9/2005 | Kramer et al. | 715/517 |
| 2009/0100342 | A1* | 4/2009 | Jakobson | 715/733 |
| 2009/0217158 | A1* | 8/2009 | Bailey | 715/255 |
| 2009/0288012 | A1* | 11/2009 | Hertel et al. | 715/738 |
| 2010/0131903 | A1* | 5/2010 | Thomson et al. | 715/847 |
| 2012/0131483 | A1* | 5/2012 | Archer et al. | 715/766 |

OTHER PUBLICATIONS

"jQuery—Follow the cursor with a DIV—Stack Overflow", Aug. 2, 2010, downloaded from http://statkoverflow.com/questions/3385936/jquery-follow-the-cursor-with-a-div, 2 pages.*
"Using CSS to affect div style inside iframe", Feb. 24, 2009, downloaded from http://stackoverflow.com/questions/583753/using-css-to-affect-div-style-inside-iframe, p. 1-3.*

(Continued)

*Primary Examiner* — Tuyetlien Tran
*Assistant Examiner* — Jaime Duckworth
(74) *Attorney, Agent, or Firm* — Fenwick & West LLP

(57) ABSTRACT

A system for enabling the drag and drop behavior detects a cursor over a non-input element and creates a container to receive an object dragged by the cursor. When the cursor drops an object on the non-input element, the container receives and stores the dropped object. The system then removes the container and provides the stored object to input field associated with the non-input element.

14 Claims, 6 Drawing Sheets

(56) References Cited

OTHER PUBLICATIONS

Brooks, S., et al., "Drag and Drop Elements for Internet Explorer," Internet4Classrooms, Nov. 2000, 2 pages, [online][retrieved on Jul. 3, 2012] Retrieved from the internet <URL: http://www.internet4classrooms.com/drag&drop.htm>.

Mozilla Firefox, "Add-Ons for FireFox—Minimap Sidebar," 3 Pages, [online][retrieved on Jul. 3, 2012] Retrieved from the internet <URL: https://addons.mozilla.ors/en-US/firefox/addon/minimap-sidebar/>.

* cited by examiner

WEB INPUT THROUGH DRAG AND DROP

BACKGROUND

1. Field of Disclosure

The disclosure generally relates to the field of receiving and formatting input for online content, in particular to receiving and formatting input for web objects through drag and drop actions.

2. Description of the Related Art

Drag and drop is a data input method that can be used to provide data objects to input elements equipped to received data through drag and drop behavior. For example, input elements like text boxes in a web page are configured to receive textual data through drag and drop behavior in addition to the user typing text in the text box. Accordingly, a user may select text in a document in one window, and drag and drop it into a text box in a web page in a separate window. Drag and drop works in this instance because the text box is natively configured to accept the dropped text as a valid textual input.

On the other hand, various non-input elements like images, lists and text in a web page are not configured to receive input through drag and drop behavior. Accordingly, a user cannot drag and drop data objects on such elements, and the user is limited to providing input related to such web objects through an associated input text box, if there is one available. For example, if a user intends to input a location name to be displayed on a map image, the user must type the location in a text box associated with the map image. The map image itself is not configured to accept an input and a user may not drag and drop text, such as a location name, on the map.

One way of adding drag and drop behavior to the non-input elements is through browser extensions. The browser extensions use the browser's application programming interfaces (APIs) to provide additional functionality for the browser. Accordingly, a browser extension may use one of the browser's API to detect and receive an object dropped on the browser, and implement an action in response to detecting the drop.

However, these extensions provide the added functionality only if the extension is supported by the browser and the user installs the extension. Accordingly, the added functionality is available for a limited set of browsers and available to a limited set of users aware of the available extension and the procedure for installing the extension.

SUMMARY

Embodiments of the invention add drag and drop behavior to non-input elements in a web page. A client application is configured to detect a cursor performing a drag and drop operation being positioned over a non-input element on a web page, and create a container to receive an object dragged by the cursor. When the cursor drops an object on the non-input element, the container receives and stores the dropped object. The client application then removes the container and provides the stored object to web page for handling. The received object may or may not be in a format that the web page can process. For example, the dragged text may be an HTML object and the web page may receive a textual input. In this case, the client application provides the stored object to a conversion server. The conversion server converts the received object into a format compatible with the web page and provides the converted object back to the client application. The client application then populates an input field associated with the non-input element. Where the object is in a format that the web page can process, the client application provides the object received from the container to the page without first providing the received object to the conversion server.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein enables drag and drop behavior for non-input elements. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
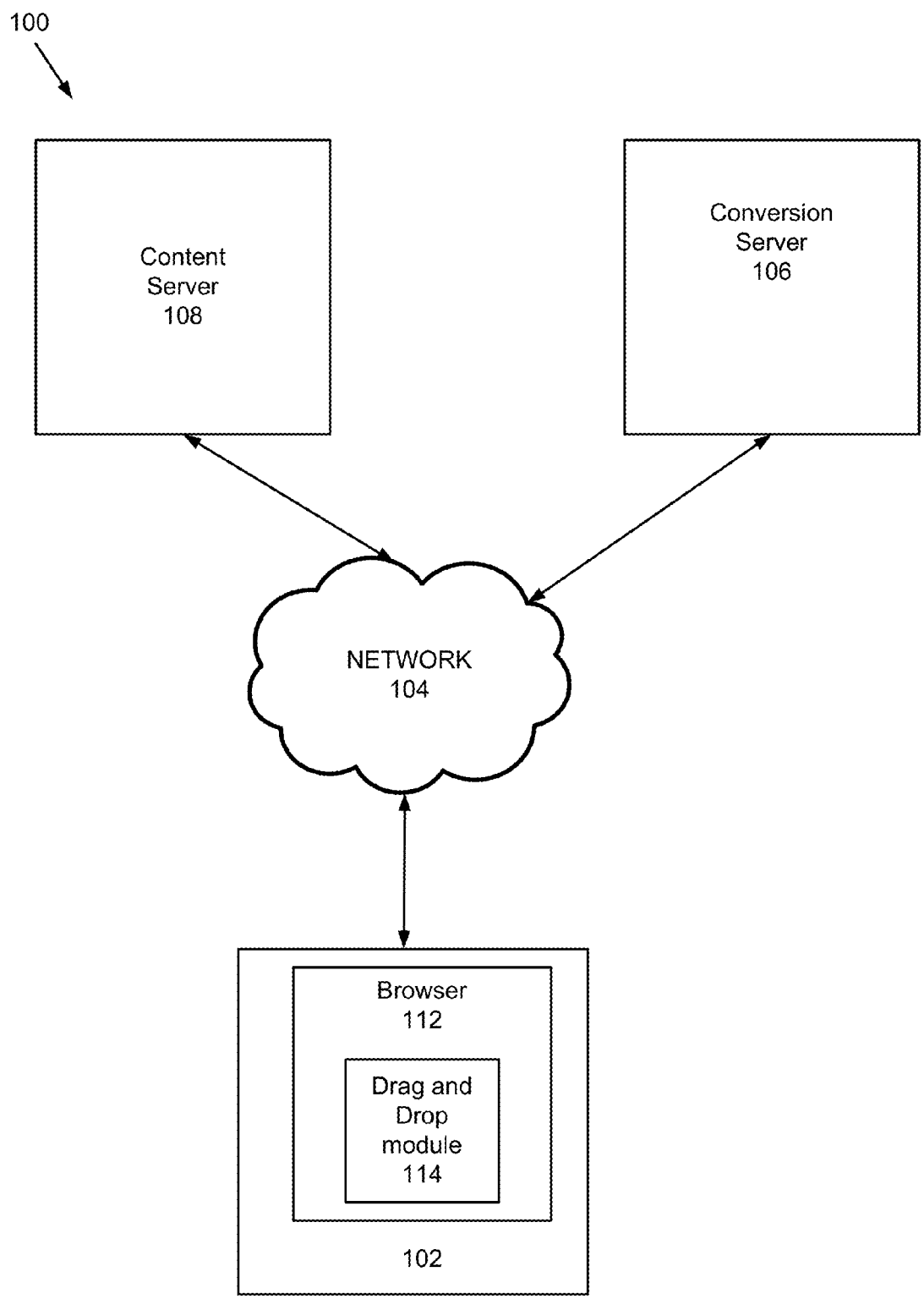
FIG. 1 is a block diagram illustrating a computing environment for supporting drag and drop feature for non-input elements according to one embodiment.

Referring to FIG. 1, the computing environment 100 for enabling the drag and drop behavior on arbitrary web pages comprises a content server 108, a client 102 with a browser 112, and optionally a conversion server 106. The client 102 is a computing device including a processor and a memory capable of running applications like browser 112. Examples of client 102 include a desktop, a laptop and a handheld computing device. While only a single client 102 is shown, it is understood that in practice, there will be large numbers of such clients.

The browser 112 is an application for retrieving, presenting, and traversing online data available on various entities like content server 108. Additionally, the browser 112 is capable of executing various software applications and interfaces received from content server 108 or other servers. For example, when a user accesses a website with an embedded client side code, like drag and drop module 114, the browser 112 receives and implements the drag and drop module 114, and displays the accessed website. In one embodiment, the browser 112 receives and implements the drag and drop module 114 without any input from the user. Accordingly, the user need not actively search or install the drag and drop module 114. The browser 112 instead installs the drag and drop module 114 when a user visits a web site that supports the drag and drop module 114.

Figure 2:
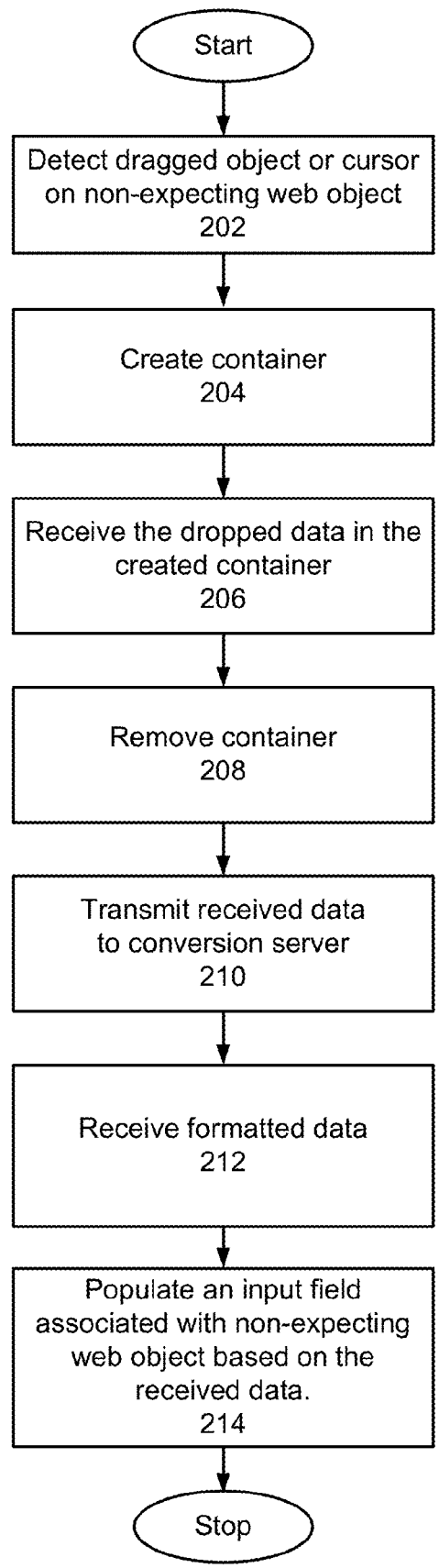
FIG. 2 is a flow diagram illustrating a method for supporting drag and drop feature for non-input elements according to one embodiment.

The drag and drop module 114 includes client side code that provides the drag and drop behavior for non-input elements. In one embodiment, the drag and drop module 112 is embedded JavaScript in the HTML page received by the browser 112 for the website accessed by the user. Regardless of the form of the drag and drop module 112, the module provides, inter alia, drag and drop functionality for non-input elements. FIG. 2 illustrates steps implemented by the drag and drop module 114 for providing this drag and drop functionality. Referring to FIG. 2, the drag and drop module 114 detects 202 a cursor positioned over a non-input element and creates a container. To detect that the cursor is over the non-input element, in one embodiment, the drag and drop module 114 attaches a callback function with a hover event, like onmouseover, associated with the non-input element. The drag and drop module 114 may attach the callback function with the hover event through a call like addEventListener. Regardless of how the callback function is attached, the hover event is fired in response to the cursor hovering over the non-input element and responsive to the hover event, the attached callback function is called.

The callback function creates 204 the container to receive the object dragged by the cursor over the non-input element. In one embodiment, the container is visibly or imperceptibly displayed and configured to follow the cursor over the non-input element. In another embodiment, the container is not configured to follow the cursor, but the container attaches a callback function with a drop event like mouseup event. If the cursor drags and drops a data object over the non-input element, the callback functions associated with the hover and drop events are called and the container receives 206 the dropped object from the callback functions. The drag and drop module 114 then, in one embodiment, receives the object from the container, removes 208 the container, and converts the received object into appropriate format. In one embodiment, the drag and drop module 114 converts the received object by providing 210 the received object to a conversion server 106 and receiving 212 the converted object from the conversion server 106. In another embodiment, the received object is not converted into another format and the drag and drop module 114 does not provide the received object for conversion to the conversion server 106.

Regardless of whether the received object is converted, the drag and drop module 114 populates 214 an input field associated with the non-input element based on the received object. In one embodiment, the associated input field is a text box or another web object capable of receiving an input displayed in proximity of the non-input element. In this embodiment, the drag and drop module 114 populates the associated text box or web object with the received object. In another embodiment, the associated input field is an API or a function call that processes the received object or provides the received object to the appropriate module for processing, and the drag and drop module 114 calls the API with the received object as a parameter.

In this manner, the drag and drop module 114 beneficially provides drag and drop functionality for non-input elements regardless of the browser APIs or non-input element's incapability of receiving dropped objects. Additionally, the beneficial integration of drag and drop module 114 with the browser 112 does not require the use of extensions. Moreover, unlike the extensions, the drag and drop module 114 is not limited to a particular browser.

The content server 108 is a computing device including a processor and a memory that stores and/or generates online content like web pages, audio or video streams, embedded web applications, and embedded web interfaces like drag and drop module 114. The content server 108 receives a request from browser 112 for a web page and its associated interfaces, and the server 108 provides the requested content over a network 104.

The conversion server 106 is a computing device including a processor and a memory that receives an object from the drag and drop module 114, converts the object into a requested format, and provides the converted object back to the drag and drop module 114. In one embodiment of the system 100 illustrated in FIG. 1, the object received by drag and drop module 114 is not converted to another format and the conversion server 106 is not included in the system 100. In another embodiment, the conversion server 106 converts the received object to a format compatible with the input field associated with the non-input element. For example, the conversion server 106 receives an HTML object including a location name, converts the received object into a textual string including a location name, and provides the converted textual string to the drag and drop module 114. In another example, the conversion server 106 receives a location name, performs a look-up of the location name in a table with geographical coordinates for various locations, retrieves the geographical coordinates indicating the location's latitude and longitude for the received location name, and provides the coordinates to the drag and drop module 114.

As another example, the conversion server 106 receives an image, determines geographical coordinates associated with the image, and provides the determined coordinates to the drag and drop module 114. Many cameras today include a geotagging feature that adds geographical information for an image as metadata for the image. Additionally, software applications and web applications prompt users for geographical information that may be added as metadata for the image. This metadata may be stored and provided as part of an image. The conversion server 106 may determine a location associated with an image based on metadata associated with the received image. Alternatively, the conversion server 106 may analyze the received image using image detection mechanisms that determine the location of the image based on one or more of the image's feature. For example, the conversion server 106 may compare the received image with stored images associated with known locations, and determine the received image's location based on the comparison.

The network 104 represents the multiple different communication pathways between the client 102, the content server 108 and the conversion server 106. The network 104 includes networks such as the Internet, as well as dedicated or private communications links that are not necessarily part of the Internet, and wired and/or wireless networks, including cellular networks, and POTS.

Drag and Drop Module

Figure 3:
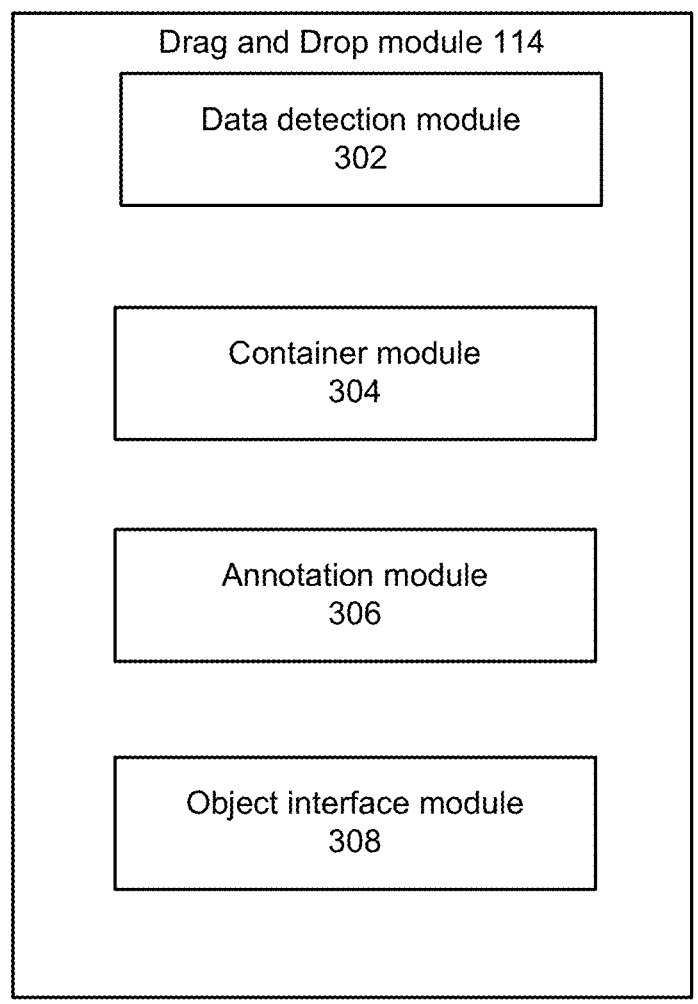
FIG. 3 is a block diagram illustrating the drag and drop module that supports the drag and drop feature for non-input elements according to one embodiment.

FIG. 3 is a block diagram illustrating the drag and drop module 114 according to one embodiment. The drag and drop module 114 comprises a data detection module 302, a container module 304, a conversion module 306 and an object interface module 308.

The data detection module 302 determines when data is dragged over a non-input element. In one embodiment, the non-input element has various associated events like hover events that are fired in response to a cursor hovering over the non-input element. The data detection module 302 attaches callback functions with these events. When a cursor hovers over the non-input elements, the hover events are fired, the attached callback functions are called, and the data detection module 302 detects the cursor over the non-input element. Upon detecting the cursor over the non-input element, the data detection module 302 provides a request to the container module 304 to create a container to receive the dragged object.

The container module 304 creates and controls a container, like an iFrame, to receive the dragged object. In one embodiment, the container module 304 creates a small (e.g. five by five pixels) imperceptible container that follows the dragged object over the non-input element. To create such a container, in one embodiment, the container module 304 repeatedly determines the location of the cursor, and repeatedly configures the location of the container to the cursor's location. The imperceptible container beneficially creates the illusion that the object is being dragged over the non-input element, but the object is actually being dragged over the container because the container is placed between the non-input element and the dragged object. Accordingly, when a cursor drops an object over the non-input element, the object is actually dropped on the container. The container receives the dropped object and provides the dragged object to the container module 304.

After receiving the dragged object, the container module 304 stores the received object in the object model for the web page, and removes the container, so that it no longer tracks the cursor. The removal of the container beneficially ensures that the container module 304 does not interfere with subsequent cursor actions. For example, after dropping the object, if a user clicks on the non-input element, the web object is selected instead of the container because the container has been removed. If the container was still following the cursor, the click would lead to selection of the container, not the web object, and therefore confuse the user. Accordingly, the container module 304 beneficially removes the container to avoid such confusion or other undesired side effects.

The conversion module 306 communicates with the conversion server 106 to facilitate the conversion of the dropped object to a format compatible with an input field associated with the non-input element. Again, in some embodiments, the conversion of the dropped object is not necessary and the conversion server 106 is not required in the system 100. Because the conversion server 106 is not required in those embodiments, a conversion module 306 is also not required to communicate with the conversion server 106. In embodiments with the conversion server 106, the conversion module 306 provides for conversion to the conversion server 106 the received object stored by the container module 304. In one embodiment, the conversion module 306 is pre-configured to store the compatible format for the received object, and the conversion module 306 provides to the conversion server 106 the compatible format with the stored object. The received compatible format is used by the conversion server 106 to convert the received object to the received compatible format. In another embodiment, the conversion server 106 is pre-configured to convert the received object to a particular format and does not need to receive the compatible format from the conversion module 306. Accordingly, the conversion module, in this embodiment, does not provide the compatible format to the conversion server 106. Regardless of whether the compatible format is provided, the object is converted by the conversion server 106 and provided to the conversion module 306. The conversion module 306 receives and stores the converted objected.

The object interface module 308 populates the input field associated with the non-input element based on the stored object. In one embodiment, the associated input field or an API for interfacing with the input field is publically available (e.g. through a publication) and the object interface module 308 is pre-configured to provide the stored object to the published input field or the API. In another embodiment, the object interface module 308 analyzes the source code of the web page to determine the input field associated with the non-input element web object. For example, the object interface module 308 uses an HTML parser to determine a list of form fields and their associated controls in a web page. The object interface module 308 presents the determined form fields to a user. The user, based on factors like names of the form fields, infers from the form fields list the input field associated with the non-input element. The object interface module 308 receives the user inferred form field and stores the received form field as the associated input field. The object interface module 308 populates the form field based on the stored object through an associated control that sets the value of the form field to the stored object. Regardless of how the object interface module 308 determines the associated input field, the object interface module 308 populates the input field based on the stored object.

Drag and Drop Feature for Maps

Figure 4:
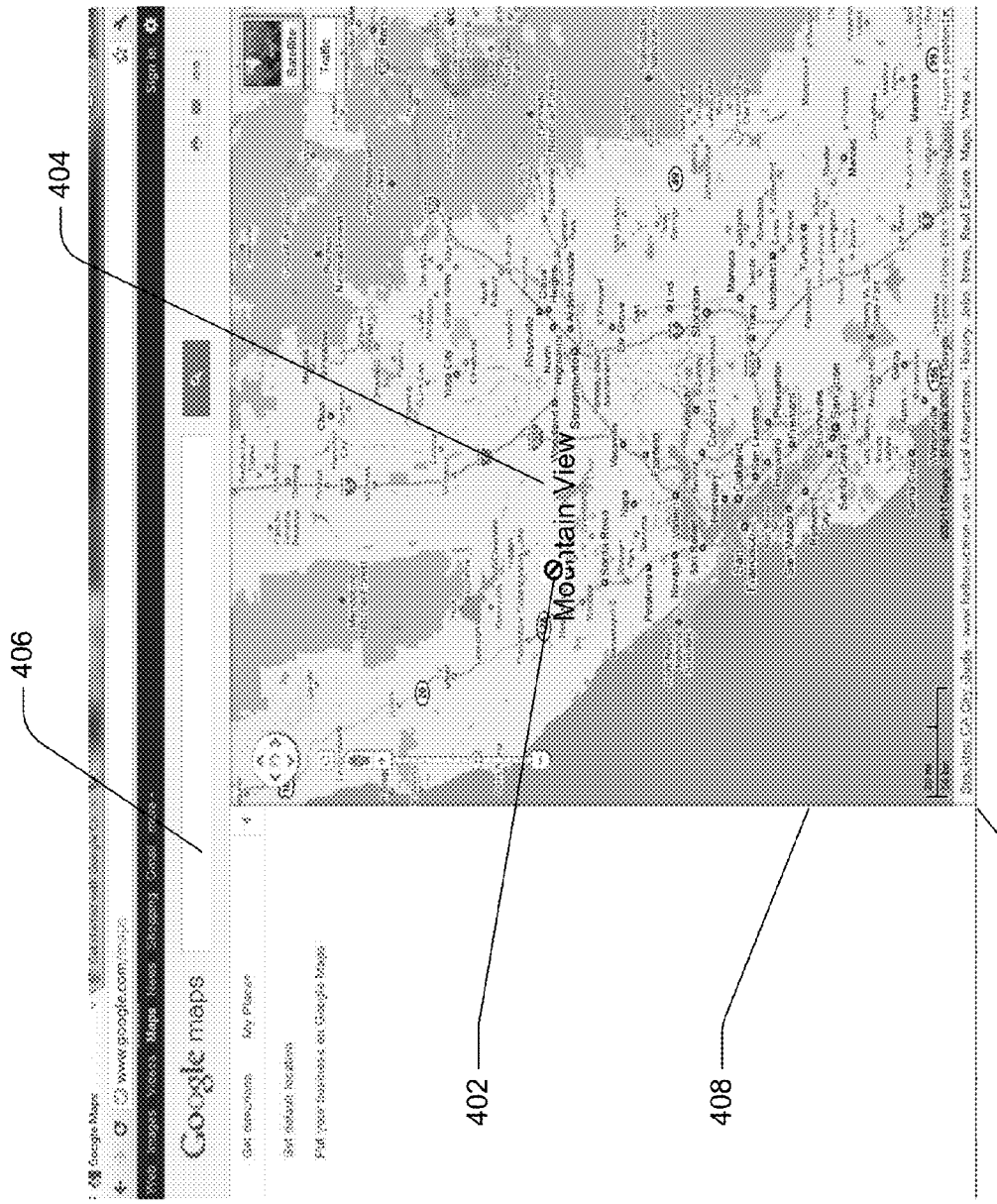
FIG. 4 is a screen shot illustrating the result of dragging and dropping objects on non-input elements.

Referring to FIG. 4, website 400 is a map web site that does not support the drag and drop feature for non-input elements. The website 400 includes an image 408, which is a non-input element, and an associated input box 406. Because the image 408 is a non-input element, the image 408 does not support the drag and drop feature. Accordingly, when a user tries to drag an object 404, a textual object in this instance, the browser 112 displays a sign 402 indicating that the user cannot drop the object 404 on image 408. The user therefore is limited to inputting the text in the associated input box 406.

Figure 5:
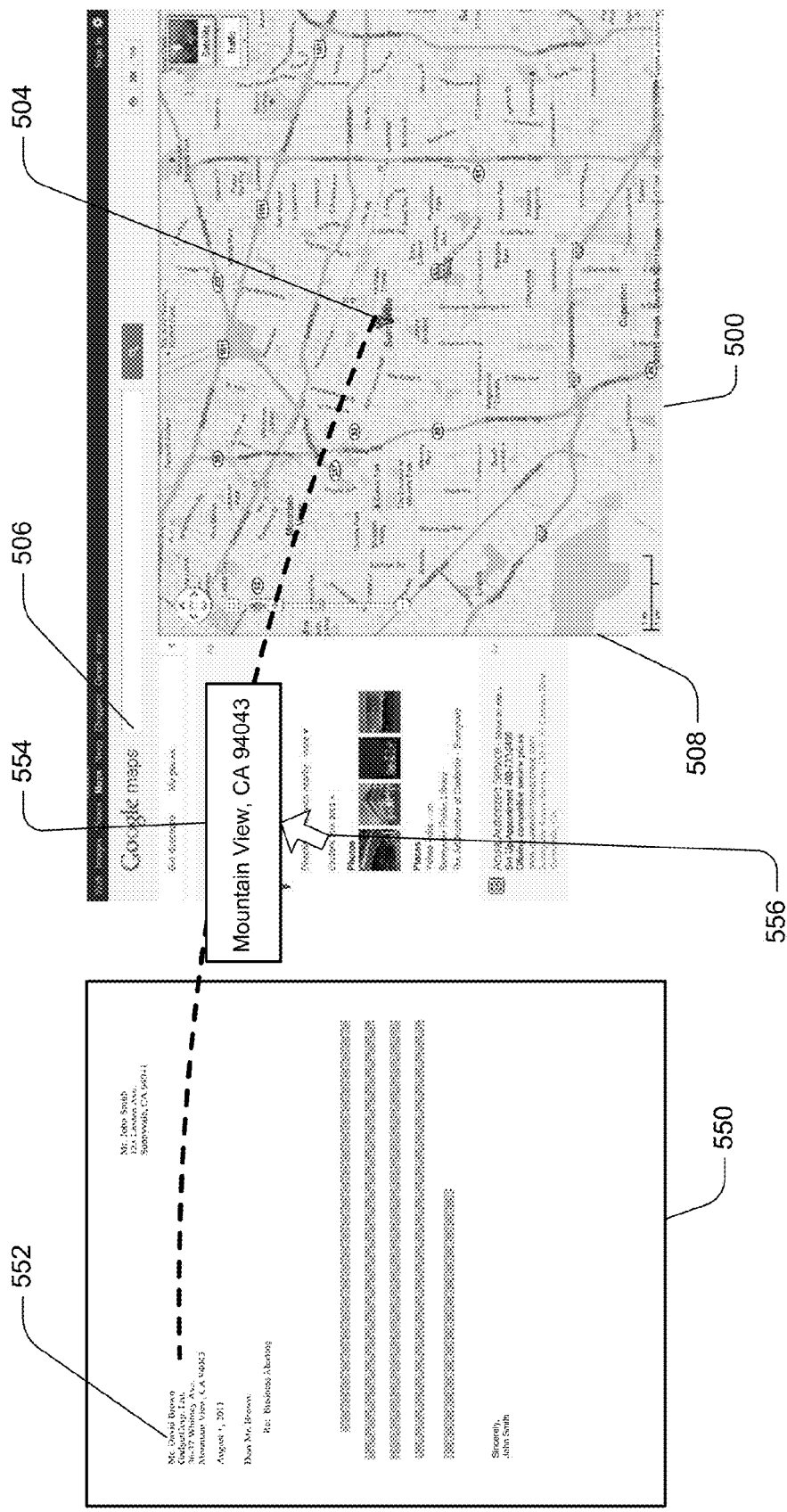
FIG. 5 is a screen shot illustrating an object dragged from one application to a non-input element in another application according to one embodiment.

FIG. 5 illustrates a text object 554 being dragged from a textual letter 550 to a website 500. The text letter includes an address 552 including a city and state name. The website 500 includes a map image 508, which is a non-input element, and an input field 506 associated with the map image 508. As illustrated in FIG. 5, the website 500 displays the area surrounding Sunnyvale, Ca and Sunnyvale, Calif. is highlighted with a marker 504. In one embodiment, when the user accesses this website 500, the browser 112 receives and installs the drag and drop module 114. Next, the user selects the text "Mountain View, Calif." with the cursor 556, and drags this as text object 554 onto map image 508 in the website 500. As the cursor 556 reaches the map image 508, the drag and drop module 114 detects the cursor 556 with the dragged text object 554 and creates a container that follows the cursor. The user then drops the dragged object 556 on the map image 508. The drag and drop module 114 receives the dropped object in the container and removes the container.

Next, the drag and drop module 114 determines whether the received object 554 is in a format acceptable to the input field 506. In this illustrated scenario, the received object 554 is in text format and the input field 506 accepts textual input. Accordingly, the drag and drop module 114 provides the received object 554 directly to input field 506.

In some cases, the received object 554 may not be in format that can be input to the input field 506. Accordingly, the drag and drop module 114 provides the received object to the conversion server 106. The conversion server 106 then extracts the text from the received object and provides the extracted text back to the drag and drop module 114. In one embodiment, the input box 506 or another input associated with the map image 508 receives the input as latitude and longitude coordinates of a location. Accordingly, the drag and drop module 114 provides the received object 506 including "Mountain View, Calif." text to the conversion server 106 and the conversion server 106 determines the latitude and longitude corresponding to "Mountain View, Calif." The conversion server 106 provides the determined coordinates to the drag and drop module 114, and the drag and drop module 114 provides the received converted object to an input box 506 or another interface of website 500. The maps application associated with the website 500 then determines the location corresponding to the received input and displays the location on the map image 508.

Figure 6:
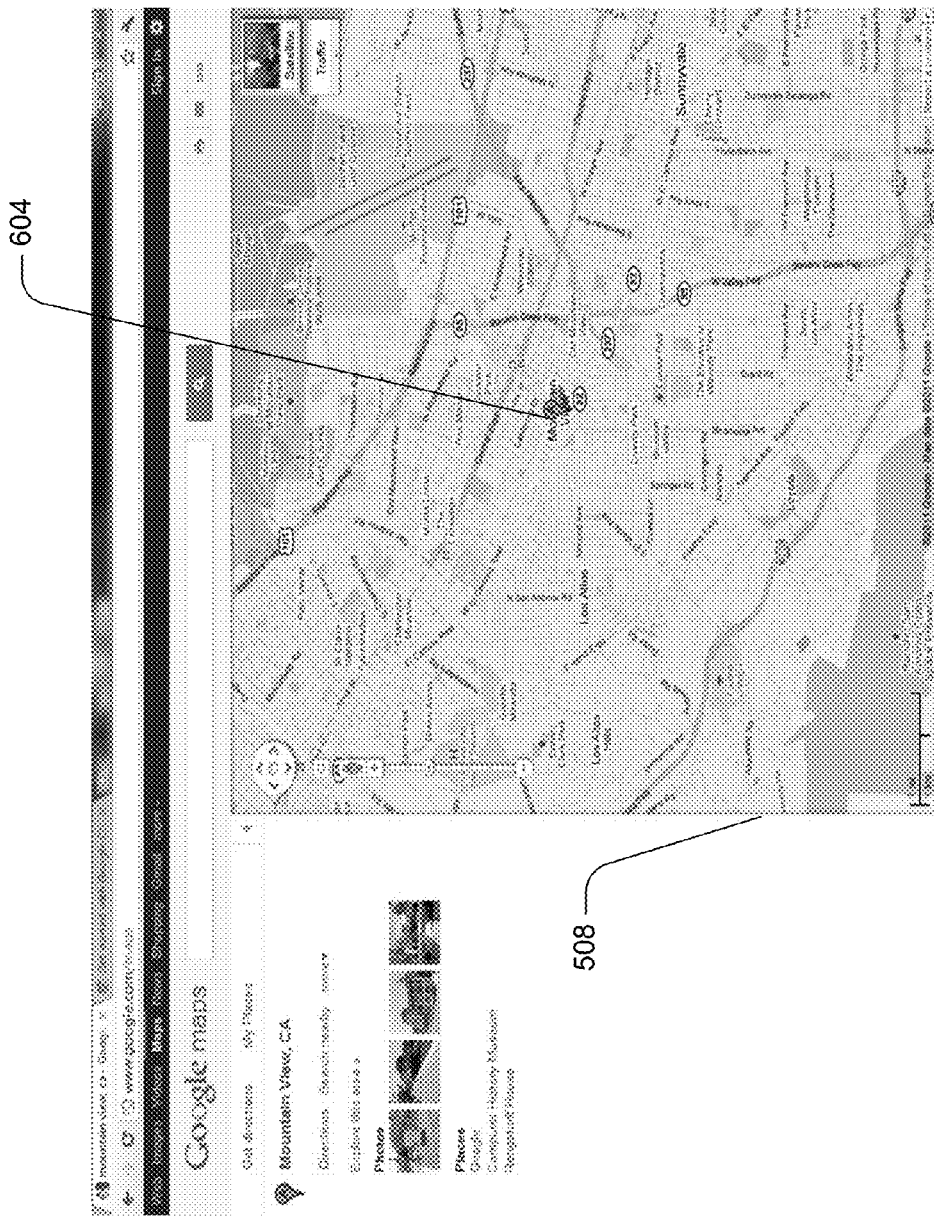
FIG. 6 is a screen shot illustrating the result of dragging and dropping an object on a non-input element according to one embodiment.

FIG. 6 illustrates the website 500 with the result of the user dropping "Mountain View, Calif." on the map image 508. As illustrated, the map image 508 now displays the map of Mountain View, Calif. and its surrounding area and Mountain View, Calif. is highlighted with a marker 604.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for receiving an input, the method comprising:
    detecting, using one or more computing devices, a cursor over a non-input element, the non-input element not capable of receiving an input through drag and drop behavior;
    creating, using the one or more computing devices, responsive to detecting the cursor over the non-input element, an imperceptible container to receive an object dragged by the cursor, the imperceptible container following the cursor and placed between the non-input element and the dragged object;
    receiving, using the one or more computing devices, the dragged object in the imperceptible container responsive to the cursor dropping the dragged object over the non-input element;
    removing, using the one or more computing devices, the imperceptible container after receiving the dragged object so that the imperceptible container no longer follows the cursor;
    storing, using the one or more computing devices, the received object; and
    populating, using the one or more computing devices, an input field with the stored object, the input field determined based on the non-input element over which the cursor is located.

2. The computer-implemented method of claim 1, wherein the non-input element is a web object and the container is an inline frame.

3. The computer-implemented method of claim 1, further comprising:
    providing the received object to a conversion server, the conversion server configured to convert the received object to a format compatible with the input field; and
    receiving a converted form of the provided object from the conversion server;
    wherein populating an input field comprises populating the input field with the converted form of the object.

4. The computer-implemented method of claim 1, wherein the non-input element is a map image and the dragged object includes a location name.

5. The computer-implemented method of claim 1, wherein the non-input element is a map image and the dragged object includes an image with a location associated with the image.

6. The method of claim 1, wherein creating the imperceptible container comprises:
    monitoring the object dragged by the cursor;
    determining a location of the cursor; and
    configuring a location of the imperceptible container relative to the determined location of the cursor such that the imperceptible container is located between the non-input element and the dragged object.

7. A non-transitory computer-readable storage medium containing executable computer program instructions for receiving an input, the instructions comprising instructions for:

detecting a cursor over a non-input element, the non-input element not capable of receiving an input through drag and drop behavior;

creating, responsive to detecting the cursor over the non-input element, an imperceptible container to receive an object dragged by the cursor, the imperceptible container following the cursor and placed between the non-input element and the dragged object;

receiving the dragged object in the imperceptible container responsive to the cursor dropping the dragged object over the non-input element;

removing the imperceptible container after receiving the dragged object so that the imperceptible container no longer follows the cursor;

storing the received object; and populating an input field with the stored object, the input field determined based on the non-input element over which the cursor is located.

8. The computer-readable storage medium of claim 7, wherein the non-input element is a web object and the container is an inline frame.

9. The computer-readable storage medium of claim 7, wherein the non-input element is a map image and the dragged object includes a location name.

10. The computer-readable storage medium of claim 7, wherein the non-input element is a map image and the dragged object includes an image with a location associated with the image.

11. A computer system for receiving an input, the computer system comprising:

a processor for executing computer program code; and a non-transitory computer-readable medium containing executable computer program code for:

detecting a cursor over a non-input element, the non-input element not capable of receiving an input through drag and drop behavior;

creating, responsive to detecting the cursor over the non-input element, an imperceptible container to receive an object dragged by the cursor, the imperceptible container following the cursor and placed between the non-input element and the dragged object;

receiving the dragged object in the imperceptible container responsive to the cursor dropping the dragged object over the non-input element;

removing the imperceptible container after receiving the dragged object so that the imperceptible container no longer follows the cursor;

storing the received object; and populating an input field with the stored object, the input field determined based on the non-input element over which the cursor is located.

12. The computer system of claim 11, wherein the non-input element is a web object and the container is an inline frame.

13. The computer system of claim 11, wherein the non-input element is a map image and the dragged object includes a location name.

14. The computer system of claim 11, wherein the non-input element is a map image and the dragged object includes an image with a location associated with the image.

* * * * *